(12) United States Patent
Chen

(10) Patent No.: US 11,400,333 B2
(45) Date of Patent: Aug. 2, 2022

(54) POWER ADJUSTMENT DEVICE

(71) Applicant: NINGHAI CAILU ELECTRICAL CO., LTD, Zhejiang (CN)

(72) Inventor: Cailu Chen, Zhejiang (CN)

( * ) Notice: Subject to any disclaimer, the term of this patent is extended or adjusted under 35 U.S.C. 154(b) by 36 days.

(21) Appl. No.: 17/043,471

(22) PCT Filed: Sep. 10, 2019

(86) PCT No.: PCT/CN2019/105062
§ 371 (c)(1),
(2) Date: Sep. 29, 2020

(87) PCT Pub. No.: WO2020/035078
PCT Pub. Date: Feb. 20, 2020

(65) Prior Publication Data
US 2021/0113876 A1    Apr. 22, 2021

(30) Foreign Application Priority Data
Aug. 14, 2018  (CN) .......................... 201810921190.9

(51) Int. Cl.
*A63B 21/008* (2006.01)
*A63B 21/00* (2006.01)
(Continued)

(52) U.S. Cl.
CPC .... *A63B 21/0087* (2013.01); *A63B 21/00069* (2013.01); *F16F 15/022* (2013.01); *G10K 11/161* (2013.01)

(58) Field of Classification Search
CPC .......... A63B 21/0087; A63B 21/00069; A63B 21/0626; A63B 2209/00; A63B 2225/09;
(Continued)

(56) References Cited

U.S. PATENT DOCUMENTS 4,290,599 A * 9/1981 Berger ............. A63B 21/00072
482/112
5,147,263 A    9/1992 Mueller
(Continued)

FOREIGN PATENT DOCUMENTS

CN    202289303 U    7/2012
CN    108714290 A    10/2018
(Continued)

*Primary Examiner* — Andrew S Lo
*Assistant Examiner* — Andrew M Kobylarz
(74) *Attorney, Agent, or Firm* — Rumit R. Kanakia

(57) ABSTRACT

The present invention discloses a power adjustment device. The power adjustment device includes a steel cylinder and a piston arranged inside the steel cylinder in a sliding mode, wherein the piston is fixedly provided with a guide rod, the guide rod being connected to a dustproof cover in a sliding mode, and a steel cable being fixed to an upper end of the guide rod; the piston is provided with a one-way air guide structure, the one-way air guide structure including an air guiding channel, the air guiding channel including a circular upper channel and a circular lower channel, and an adjustment ball being arranged inside the upper channel; and purposes of eliminating vibration, lowering noise, eliminating potential safety hazards, being more convenient in assembly and lowering cost are achieved.

6 Claims, 8 Drawing Sheets

(51) Int. Cl.
*F16F 15/02* (2006.01)
*G10K 11/16* (2006.01)

(58) Field of Classification Search
CPC ............. A63B 2225/62; A63B 2225/66; F16F 15/022; F16F 15/02; F16F 15/023; F16F 15/021; F16F 15/03; G10K 11/161
See application file for complete search history.

(56) References Cited

U.S. PATENT DOCUMENTS

| | | | | |
|---|---|---|---|---|
| 5,558,190 A | * | 9/1996 | Chang ................ | A63B 21/0087 188/285 |
| 5,622,527 A | * | 4/1997 | Watterson ............ | A63B 21/023 482/112 |
| 5,951,449 A | * | 9/1999 | Oppriecht .......... | A63B 21/0087 482/113 |

FOREIGN PATENT DOCUMENTS

| | | |
|---|---|---|
| CN | 208678252 U | 4/2019 |
| KR | 10-2009-0096845 A | 9/2009 |
| KR | 10-2014-0078900 A | 6/2014 |
| WO | WO-2004/087262 A2 | 10/2004 |

* cited by examiner

POWER ADJUSTMENT DEVICE

FIELD

The present invention relates to the technical field of fitness equipment, in particular to a power adjustment device.

BACKGROUND

Along with the development of society, people pay more attention to health gradually, various exercise modes emerge endlessly, fitness equipment is widely used as a common exercise tool, and in the existing fitness equipment, a method for exercising by pulling balancing weights with different weights through a steel cable is commonly adopted. This method has the following defects: 1, large vibration and noise exist when a balancing weight falls, 2, no isolation exists around the balancing weight when the balancing weight falls, resulting in potential safety hazards, 3, the balancing weight is large in mass and inconvenient to assemble, and 4, the cost is high due to use of the balancing weight.

SUMMARY

In order to solve at least one technical problem mentioned above in the prior art, the present invention provides a power adjustment device to achieve purposes of eliminating vibration, lowering noise, eliminating potential safety hazards, being more convenient in assembly and lowering cost.

The technical solution used by the present invention is as follows: a power adjustment device is provided and includes a steel cylinder and a dustproof cover fixed at an upper end of the steel cylinder, a piston being slidably arranged in the steel cylinder, the piston being fixedly provided with a guide rod that is slidably connected to the dustproof cover, and a steel cable being fixed at an upper end of the guide rod.

The piston is provided with at least one one-way air guide structure, the one-way air guide structure including an air guiding channel, wherein the air guiding channel includes a circular upper channel and a lower channel with a diameter smaller than that of the upper channel, an adjustment ball with a diameter larger than that of the lower channel and smaller than that of the upper channel being arranged inside the upper channel.

An upper end of the steel cylinder is at least provided with one vent hole, so that tension needed when the piston ascends falls within a range capable of being borne by people, and effects of exhausting air and conveniently returning the piston when the piston descends are achieved favorably. A bottom surface of the piston is provided with an upper silencing pad, and a bottom plate is arranged at a lower end of the steel cylinder, a lower silencing pad being arranged on the bottom plate, so that hard collision is avoided, a buffering effect is achieved, the service life is prolonged, and noise is reduced. A position, corresponding to the lower channel, of the upper silencing pad is provided with an upper silencing pad through hole, and a lower silencing pad is provided with a rectangular through hole.

An opening end of a first circular blind hole is provided with a step, and the step is provided with a closed ring, so that axial disengagement of an air volume adjusting shaft is prevented favorably.

The bottom plate is provided with a rectangular air volume adjusting mechanism or a circular air volume adjusting mechanism, wherein the rectangular air volume adjusting mechanism includes a rectangular air valve and a first rectangular blind hole that are arranged on the bottom plate and communicate with each other, an air volume adjusting sheet being slidably arranged inside the first rectangular blind hole, and the ventilation volume of the rectangular air valve is controlled by pulling the air volume adjusting sheet in a sliding mode, so that force required when the piston ascends is changed, and an effect of replacing different balancing weights is achieved.

The circular air volume adjusting mechanism is arranged on the bottom plate and includes a first circular blind hole and a first through hole that are provided in the bottom plate and perpendicular to each other, and communicate with each other, an air volume adjusting shaft being rotatably arranged inside the first circular blind hole, a second circular blind hole being provided in the air volume adjusting shaft in an axial direction, and a large air volume adjusting hole and a small air volume adjusting hole being provided in the air volume adjusting shaft in a circumferential direction, and the large air volume adjusting hole or small air volume adjusting hole is made to be opposite the first through hole by rotating the air volume adjusting shaft to adjust the ventilation volume, so that force needed when the piston ascends is changed, and an effect of replacing different balancing weights is achieved.

The present invention provides two air volume adjusting mechanisms, namely the rectangular air volume adjusting mechanism and the circular air volume adjusting mechanism so as to achieve a purpose of replacing the balancing weight with the device of the present application; movement of the piston inside the steel cylinder is obviously safer than movement of a traditional exposed balancing weight; and compared with existing sports equipment, the device of the present invention is lighter in weight, simpler in structure, and lower in manufacturing cost.

Figure 1:
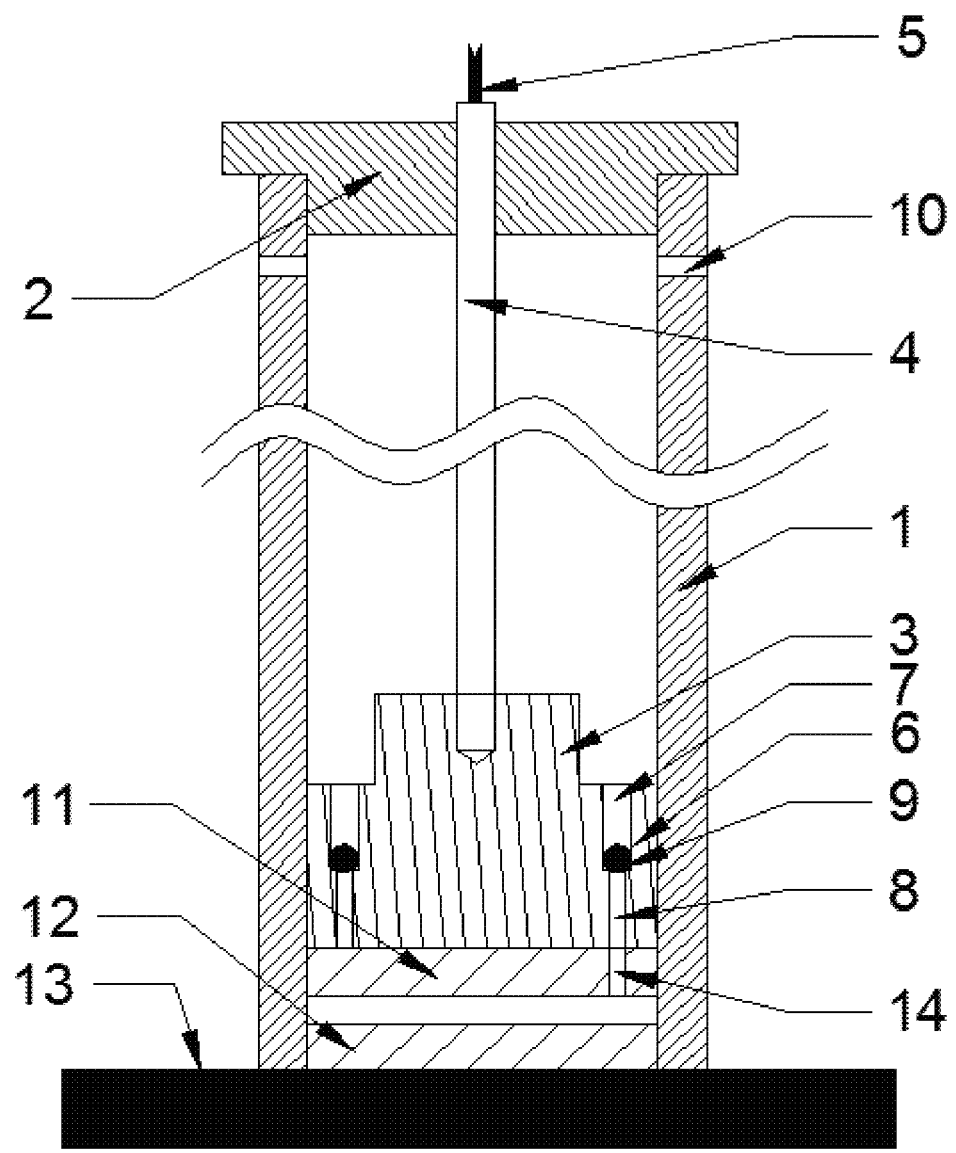
FIG. 1 is an overall structural schematic diagram of the present invention.
Figure 2:
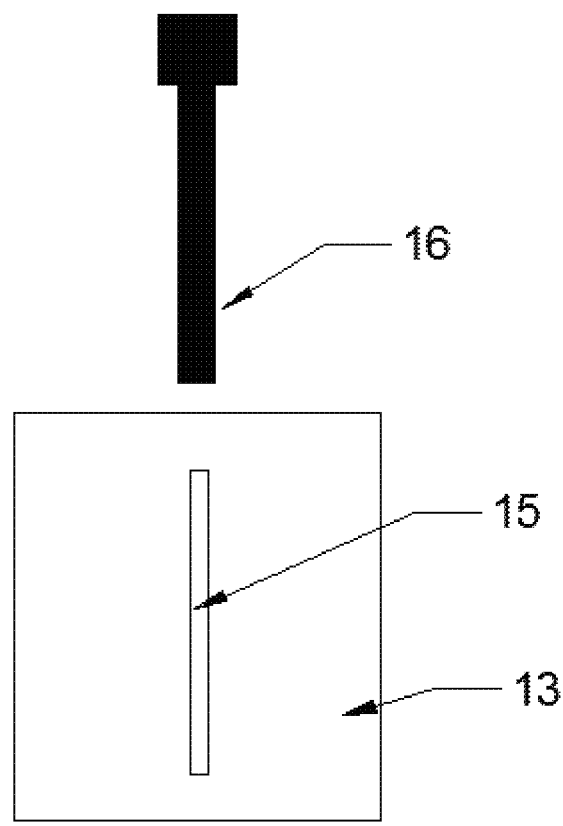
FIG. 2 is a top-view structural schematic diagram of a rectangular air volume adjusting mechanism of the present invention.
Figure 3:
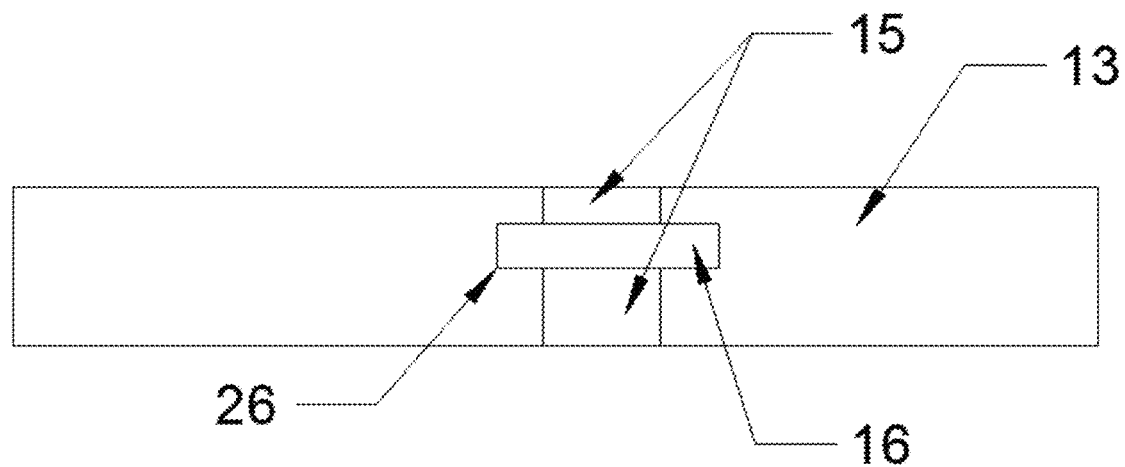
FIG. 3 is a side-view sectional structural schematic diagram of a rectangular air volume adjusting mechanism of the present invention.
Figure 4:
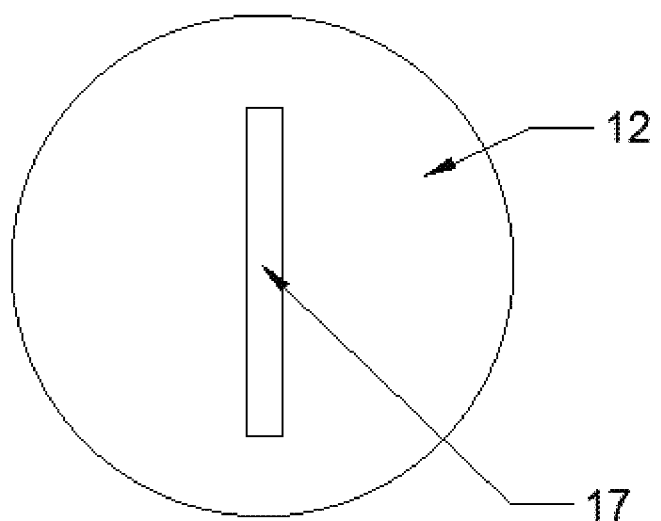
FIG. 4 is a structural schematic diagram of a lower silencing pad 12 of the present invention.
Figure 5:
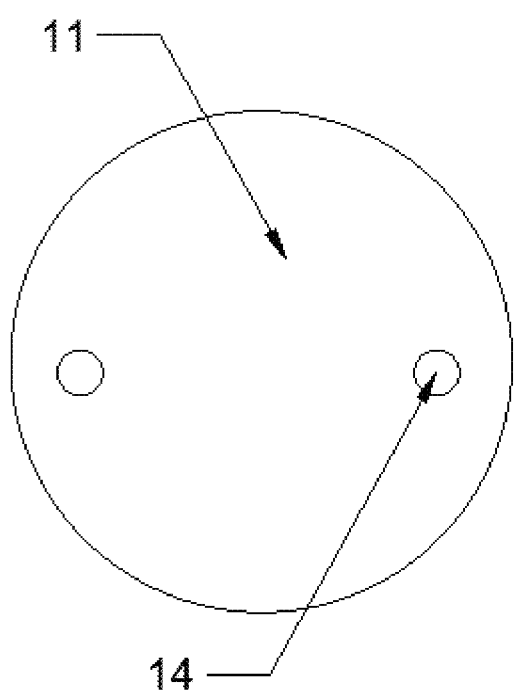
FIG. 5 is a structural schematic diagram of an upper silencing pad 11 of the present invention.
Figure 6:
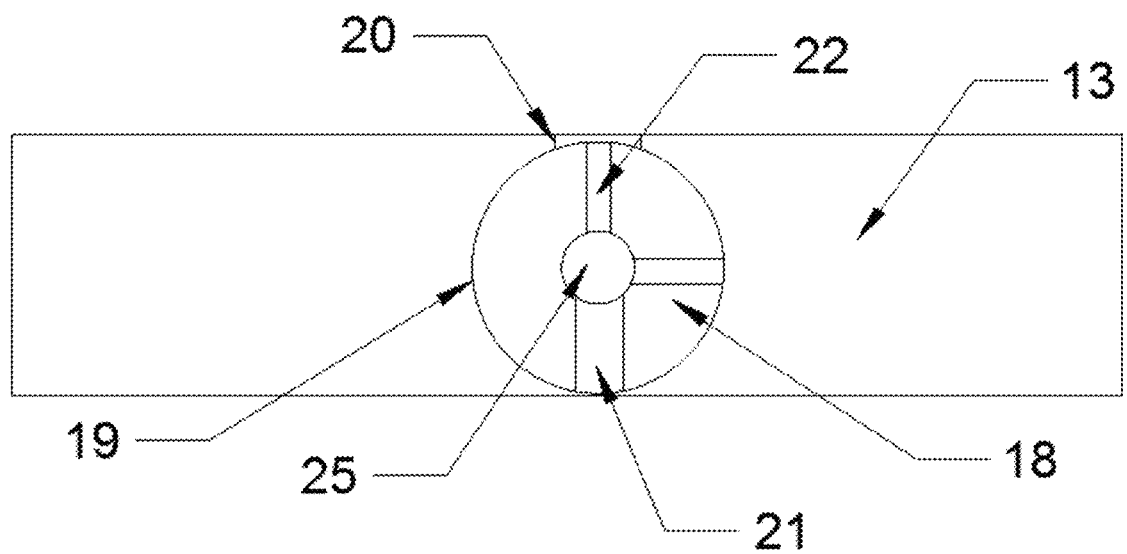
FIG. 6 is a side-view sectional structural schematic diagram of a circular air volume adjusting mechanism of the present invention.
Figure 7:
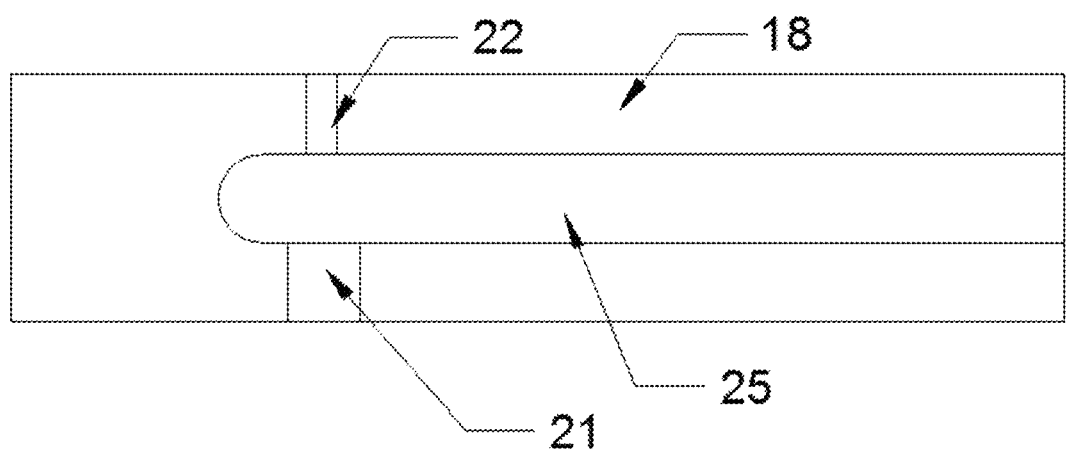
FIG. 7 is a structural schematic diagram of an air volume adjusting shaft 18 of the present invention.
Figure 8:
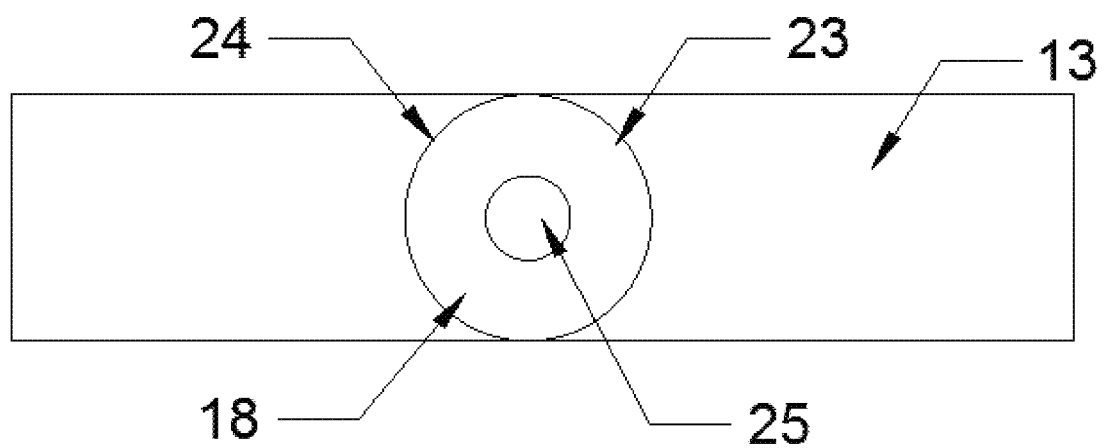
FIG. 8 is a side-view structural schematic diagram of a circular air volume adjusting mechanism of the present invention.

In the figures: 1—steel cylinder; 2—dustproof cover; 3—piston, 4—guide rod; 5—steel cable; 6—air guiding channel; 7—upper channel; 8—lower channel; 9—adjustment ball; 10—vent hole; 11—upper silencing pad; 12—lower silencing pad; 13—bottom plate; 14—upper silencing pad through hole; 15—rectangular air valve; 16—air volume adjusting sheet; 17—rectangular through hole; 18—air volume adjusting shaft; 19—first circular blind hole; 20—first through hole; 21—large air volume adjusting hole; 22—small air volume adjusting hole; 23—step; 24—closed ring; 25—second circular blind hole; 26—first rectangular blind hole.

DETAILED DESCRIPTION OF THE EMBODIMENTS

Embodiment 1

Referring to the drawings, this embodiment uses the following technical solution: a power adjustment device includes a steel cylinder 1 and a dustproof cover 2 fixed at an upper end of the steel cylinder 1, a piston 3 being slidably arranged inside the steel cylinder 1, the piston 3 being fixedly provided with a guide rod 4 that is slidably connected with the dustproof cover 2, and a steel cable 5 being fixed at an upper end of the guide rod 4.

The piston 3 is provided with at least one one-way air guide structure, the one-way air guide structure 3 including an air guiding channel 6, wherein the air guiding channel 6 includes a circular upper channel 7 and a lower channel 8 with a diameter smaller than that of the upper channel 7, an adjustment ball 9 with a diameter larger than that of the lower channel 8 and smaller than that of the upper channel 7 being arranged in the upper channel 7.

The upper end of the steel cylinder 1 is at least provided with one vent hole 10, so that tension needed when the piston 3 ascends falls within a range capable of being borne by people, and effects of exhausting air and conveniently returning the piston 3 when the piston 3 descends are achieved favorably. A bottom surface of the piston 3 is provided with an upper silencing pad 11, and a bottom plate 13 is arranged at a lower end of the steel cylinder 1, a lower silencing pad 12 being arranged on the bottom plate 13, so that hard collision is avoided, a buffering effect is achieved, the service life is prolonged, and noise is reduced. A position, corresponding to the lower channel 8, of the upper silencing pad 11 is provided with an upper silencing pad through hole 14, and the lower silencing pad 12 is provided with a rectangular through hole 17.

An opening end of a first circular blind hole 19 is provided with a step 23, and the step 23 is provided with a closed ring 24, so that axial disengagement of an air volume adjusting shaft 18 is prevented favorably.

The bottom plate 13 is provided with a rectangular air volume adjusting mechanism, wherein the rectangular air volume adjusting mechanism includes a rectangular air valve 15 and a first rectangular blind hole 26 that are arranged on the bottom plate 13 and communicate with each other, an air volume adjusting sheet 16 being slidably arranged inside the first rectangular blind hole 26, and the ventilation volume of the rectangular air valve 15 is controlled by pulling the air volume adjusting sheet 16 in a sliding mode, so that a force required when the piston 3 ascends is changed, and an effect of replacing different balancing weights is achieved.

Embodiment 2

A power adjustment device described in this embodiment is the same as that in Embodiment 1 in structure, but is different from that in Embodiment 1 in that: a bottom plate 13 is provided with a circular air volume adjusting mechanism, the circular air volume adjusting mechanism includes a first circular blind hole 19 and a first through hole 20 that are provided in the bottom plate 13 and perpendicular to each other, and communicate with each other, and air may flow to the first circular blind hole 19 from the first through hole 20; and an air volume adjusting shaft 18 is rotatably arranged inside the first circular blind hole 19, a second circular blind hole 25 is provided in the air volume adjusting shaft 18 in an axial direction, a large air volume adjusting hole 21 and a small air volume adjusting hole 22 are provided in the air volume adjusting shaft 18 in a circumferential direction, and the large air volume adjusting hole 21 or small air volume adjusting hole 22 is made to be opposite the first through hole 20 by rotating the air volume adjusting shaft 18 to adjust the ventilation volume, so that a force needed when a piston 3 ascends is changed, and an effect of replacing different balancing weights is achieved.

According to the above working principle: when the piston 3 is pulled up, due to the fact that a gap between the steel cylinder 1 and the piston 3 is small, the air needs a certain time period to achieve air pressure balance after entering a lower space of the piston 3, and upper air pressure of the piston 3 in a cylinder body is larger than lower air pressure of the piston 3 before balance is achieved, so that downward pressure is generated on the piston 3, a user overcomes the pressure through his/her own pulling force, and the pressure can be utilized as an adjusting force of strength type fitness equipment to replace an effect of a traditional balancing weight.

When the piston 3 is pulled up, the adjustment ball 9 may block the air guiding channel 6 on the piston 3, so that the air may not enter the lower space of the piston 3 from this position, maximum pressure difference of an upper space and the lower space is guaranteed, and the air in the upper space of the piston 3 may be smoothly exhausted through the vent hole 10. When the piston 3 moves downwards, the adjustment ball 9 may be blown up by the air, so that the pressure difference between the upper space and the lower space of the piston 3 is rapidly reduced, and smooth descending and returning of the piston 3 are facilitated.

What is claimed is:
1. A power adjustment device, comprising a steel cylinder and a dustproof cover fixed at an upper end of the steel cylinder, wherein a piston is slidably arranged inside the steel cylinder, the piston being fixedly provided with a guide rod, the guide rod being slidably connected with the dustproof cover, and a steel cable being fixed at an upper end of the guide rod;
    a lower end of the steel cylinder is provided with a bottom plate, the piston is provided with at least one one-way air guide structure, and the upper end of the steel cylinder is provided with a vent hole;
    wherein the bottom plate is provided with a rectangular air volume adjusting mechanism, the rectangular air volume adjusting mechanism being arranged on the bottom plate and comprising a rectangular air valve and a first rectangular blind hole that are arranged on the bottom plate, an air volume adjusting sheet being slidably arranged inside the first rectangular blind hole, and the rectangular air valve communicating with the first rectangular blind hole; or,
    wherein the bottom plate is provided with a circular air volume adjusting mechanism, the circular air volume adjusting mechanism comprising a first circular blind hole and a first through hole that are provided in the bottom plate, the first circular blind hole and the first through hole being perpendicular to and communicating with each other, an air volume adjusting shaft being rotatably arranged inside the first circular blind hole, and a second circular blind hole and an air volume adjusting hole being provided in the air volume adjusting shaft.

2. The power adjustment device according to claim 1, wherein a bottom surface of the piston is provided with an upper silencing pad.

3. The power adjustment device according to claim 2, wherein the bottom plate is a lower silencing pad is provided with the bottom plate.

4. The power adjustment device according to claim 3, wherein a position, corresponding to a lower channel, of the upper silencing pad is provided with an upper silencing pad through hole, and the lower silencing pad is provided with a rectangular through hole.

5. The power adjustment device according to claim 4, wherein an opening end of the first circular blind hole is provided with a step, and the step is provided with a closed ring.

6. The power adjustment device according to claim 1, wherein the one-way air guide structure comprises the air guiding channel, and the piston is provided with an air guiding channel comprising an upper channel and a lower channel with a diameter smaller than that of the upper channel, an adjustment ball with a diameter larger than that of the lower channel and smaller than that of the upper channel being arranged inside the upper channel.

* * * * *